United States Patent [19]

Schauder

[11] Patent Number: 5,005,115

[45] Date of Patent: Apr. 2, 1991

[54] FORCED-COMMUTATED CURRENT-SOURCE CONVERTER AND AC MOTOR DRIVE USING THE SAME

[75] Inventor: Colin D. Schauder, Murrysville, Pa.

[73] Assignee: Westinghouse Electric Corp., Pittsburgh, Pa.

[21] Appl. No.: 386,067

[22] Filed: Jul. 28, 1989

[51] Int. Cl.$^5$ .......................................... H02M 5/257
[52] U.S. Cl. .................................... 363/159; 363/160
[58] Field of Search ................. 363/157, 159, 160–165

[56] References Cited

U.S. PATENT DOCUMENTS

| | | | |
|---|---|---|---|
| 3,493,838 | 2/1970 | Gyugyi et al. | |
| 4,002,958 | 1/1977 | Akamatsu | 318/227 |
| 4,642,751 | 2/1987 | Schauder | 363/159 |
| 4,648,022 | 3/1987 | Schauder | 363/159 |
| 4,713,745 | 12/1987 | Schauder | 363/161 |
| 4,763,240 | 8/1988 | Voss | 363/161 |
| 4,777,581 | 10/1988 | Smith | 363/161 |

OTHER PUBLICATIONS

Kenneth P. Phillips/IEEE Trans. Ind. Appln., vol. IA-8, pp. 679–683, Nov./Dec. 1972, "Current Source Converter for AC Motor Drives".

Primary Examiner—Steven L. Stephan
Assistant Examiner—Emanuel Todd Voeltz
Attorney, Agent, or Firm—Charles M. Lorin

[57] ABSTRACT

An AC-to-AC converter operating as a current-source between an AC input line and an AC output line connected to a load, for instance an AC motor, includes three groups of bilateral switches controlled selectively within each group so as to generate a quasi square-wave current in each output phase while establishing a DC voltage between two of the output phases at a time, the third phase being idle, the magnitude of the output voltage being controlled in relation to the firing angle of the switches and the frequency being established by controlling the duration of each square-wave alternance. The duration of such alternances is set to 120 degrees of the output wave, followed and preceded by a 60 degree zero-current period.

11 Claims, 10 Drawing Sheets

FORCED-COMMUTATED CURRENT-SOURCE CONVERTER AND AC MOTOR DRIVE USING THE SAME

FIELD OF THE TECHNIQUE

The invention relates to AC motor drives in general, and more particularly to an AC motor drive including a current-source.

BACKGROUND OF THE INVENTION

Auto-sequentially commutated current-source inverter (ASC-CSI) is a system known to produce a unidirectional DC current in a link between an AC-DC converter and an inverter. See for instance "Current-Source Converter for AC Motor Drives" by Kenneth P. Phillips in IEEE Trans. Ind. Appl., vol. IA-8, pp. 679–683, Nov./Dec. 1972. In this system, control of the inverter with thyristors amounts to steering the direct current of the DC-link through any one of six paths in the machine. Commutation from one path to the next is achieved with the aid of auxiliary commutation capacitors and blocking diodes.

It is also known from U.S. Pat. No. 4,648,022 to use three groups of three bilateral switches controlled between a three-phase AC power supply and the three phases of an AC motor controlled according to a switch polarity pattern exhibiting a "hidden DC-link" so as to supply AC power to an AC motor. The "hidden DC-link" also appears in FIG. 7 of U.S. Pat. No. 4,002,958, where an inverter configuration is achieved with six groups of three unidirectional switches.

It is now proposed to establish a current-source converter for an AC motor drive without using a converterinverter combination like in the Kenneth P. Phillips article, thus, without having a DC-link, but rather to apply directly the AC power supply, through a matrix-type set of a bilateral static-controlled switches, making use of an hidden DC-link like found in U.S. Pat. No. 4,648,022, to the AC motor.

SUMMARY OF THE INVENTION

The invention resides in using a matrix of bilateral switches interposed directly between input and output AC phases so as to create a current-source of controlled magnitude and frequency applied to the AC motor.

This is implemented, according to the present invention, by controlling three groups of three bidirectional static switches under the input AC power supply so that for successive periods of 60 degrees two phases of the AC motor are in a closed loop for DC current passing under opposite polarity voltages, the third phase being with zero current. In this system, each phase of the motor passes DC current during 120 degrees, this being done under two successive groups of switches for the same polarity, each group being operative during 60 degrees.

With this system, the alternating current generated by the bridge is a quasi-square wave, thus, approximating a sine wave. However, thanks to forcedcommutation with bidirectional power switches, the transition from one 60 period group to the next is quasi instantaneous, and there is no need for auxiliary commutation capacitors, nor for a DC-Link choke as in a conventional ASC-CSI system. This advantage pertains to the "hidden DC-link" which the invention has in common with the AC/AC converter disclosed in U.S. Pat. No. 4,648,022, but in the latter, a voltage-source is involved, not a current-source. In addition, with the present invention, the generated current is controlled by a closed-loop responding to an error of current magnitude used to control the voltage as the parameter for establishing the proper current. Control is here simplified by the use of a simple current regulator with proportional plus integral compensation for the voltage demand coupled with current feedback.

Additional circuitry is required, however, to ensure that between incoming and outgoing phases of the polarity groups, commutation occurs leaving a third phase without current. This is achieved with a clamping circuit involving a capacitor, a diode bridge and an energy dissipating circuit. A special inductor arrangement is moreover used in order to eliminate the formation of a ripple on the AC input current, while allowing natural commutation of the switches within the groups.

The following advantages obtain:
(a) a much shorter time of commutation;
(b) the absence of current spikes on the output current;
(c) a high frequency of operation;
(d) power factor compensation; and
(e) startup without precharged commutation capacitors.

Control of the motor drive is effected without the need for pulse-width modulation. The outputted phase line currents are sensed and used to synthesize a single quasi direct-current feedback representative signal which is compared with a demand current reference signal, thereby to derive a signal which determines the firing angle of the switches which within a group are being selected for conduction.

BRIEF DESCRIPTION OF THE DRAWINGS

FIG. 6A shows with curves the operation of a hidden-link converter system according to the prior art and FIG. 2; whereas

DESCRIPTION OF THE INVENTION

Figure 1:
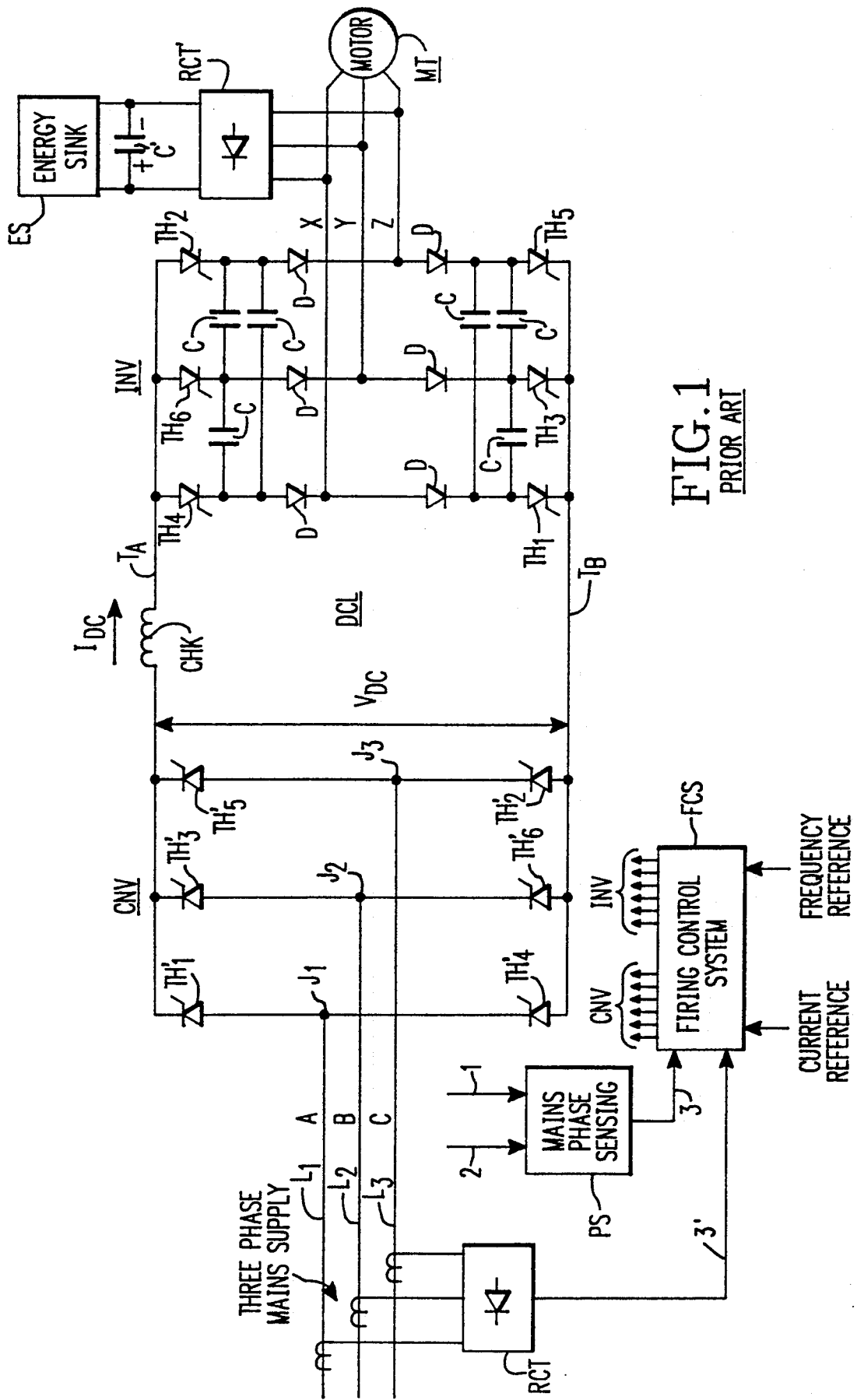
FIG. 1 is a diagram representation of an ACS-CSI circuit associated with an AC motor drive.

Referring to FIG. 1, a conventional currentsource inverter includes an AC/DC converter CNV and a DC/AC inverter INV interconnected by a DC-Link DCL. The inverter is coupled through a choke CHK to the so-derived DC voltage Vdc. This voltage is controlled, on the converter side, so as to generate a DC-link current whereas, on the inverter side, switching is controlled so as to generate an AC current output of selected frequency. The input AC power is supplied from lines L1, L2, L3 for respective phases A,B,C. Generally, a six-thyristor bridge (TH'1 to TH'6) is used for converter CNV and also six thyristors (TH1 to TH6) for the inverter INV. Control of the inverter is done in different ways, for instance using pulse-width-modulation to control the switches in succession, thereby to generate AC output waves of controlled magnitude and frequency which can be used, for instance, for the respective phases X, Y, Z of motor MT of a motor drive. To this effect, the line-to-line voltage v12 is sensed, via lines 1 and 2 derived from main lines L1 and L2 of the power supply, using a phase-locked loop as part of a mains phase sensing circuit PS to generate a voltage reference signal on line 3. The latter is combined with a rectifier RCT responsive to the sensed main line currents for providing on line 3' a feedback current signal to be used with the signal of line 3 by the firing control system FCS which controls the firing angle of the thyristors of the converter. A clamping circuit is provided including a rectifier RCT', a capacitor C' and an energy sink ES, for the purpose of limiting peak line-to-line voltages arising during commutation on lines X, Y, Z. This prior art will be referred to hereinafter as the auto-sequentially commutated current-source inverter (ASC-CSI).

An approach in the prior art to generate a multiphase variable frequency variable voltage output, is the frequency changer, more specifically the unrestricted frequency changer (UFC), as described in U.S. Pat. Nos. 3,470,447 and 3,493,838 of L. Gyugyi et al. In such case, bilateral switches are used on each phase of the AC input to connect with each phase of the AC output, while providing current flow in both directions.

The bilateral switches preferably incorporate devices which are capable of being triggered ON at will and of being interrupted at will, by triggering to permit current flow, in either direction. Such devices typically are the transistor, and the GTO thyristor.

Figure 2:
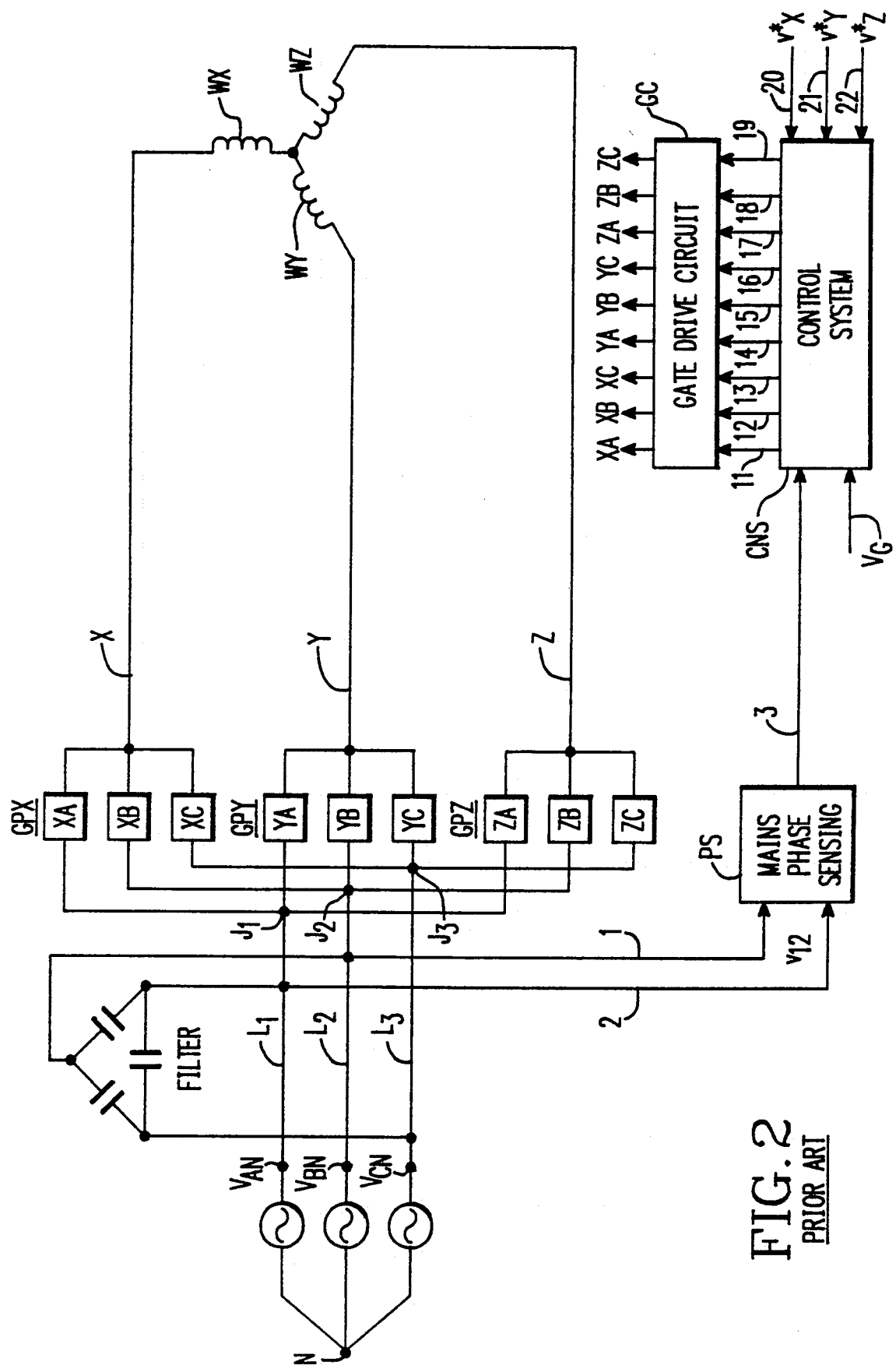
FIG. 2 is a diagram representation of a voltage-source type hidden DC-Link AC/AC converter of a prior art AC motor drive.

Referring to FIG. 2, a switching control scheme of the prior art is illustrated which uses the bilateral switch configuration of a three-pulse UFC system, as shown in U.S. Pat. No. 4,642,751 of Colin Schauder. There, three groups GPX, GPY and GPZ of three bilateral switches XA, XB, XC for motor drive phase X and the respective input phase lines A, B, C, for GPX, YA, YB, YC for GPY, ZA, ZB, ZC for GPZ form a nine-switch system. Within such a group, the three switches are selected, one at a time, according to either a positive polarity, or a negative polarity switching pattern. Positive, or negative switching is arranged to produce at the output a phase-to-neutral DC voltage of the same polarity. The voltage magnitude can be controlled by phase shifting. With such an arrangement, it appears that each group exhibits a three-pulse envelope and behaves in fact like a three-pulse rectifier/inverter under a "hidden" DC-Link defined by the voltage polarities of the two groups due to respective firing angles one at zero degree, the other at 180 degree. The effect on the load at any instant is the same as under the output of a six-pulse rectifier bridge with phase control operated at constant phase angle.

Figure 3:
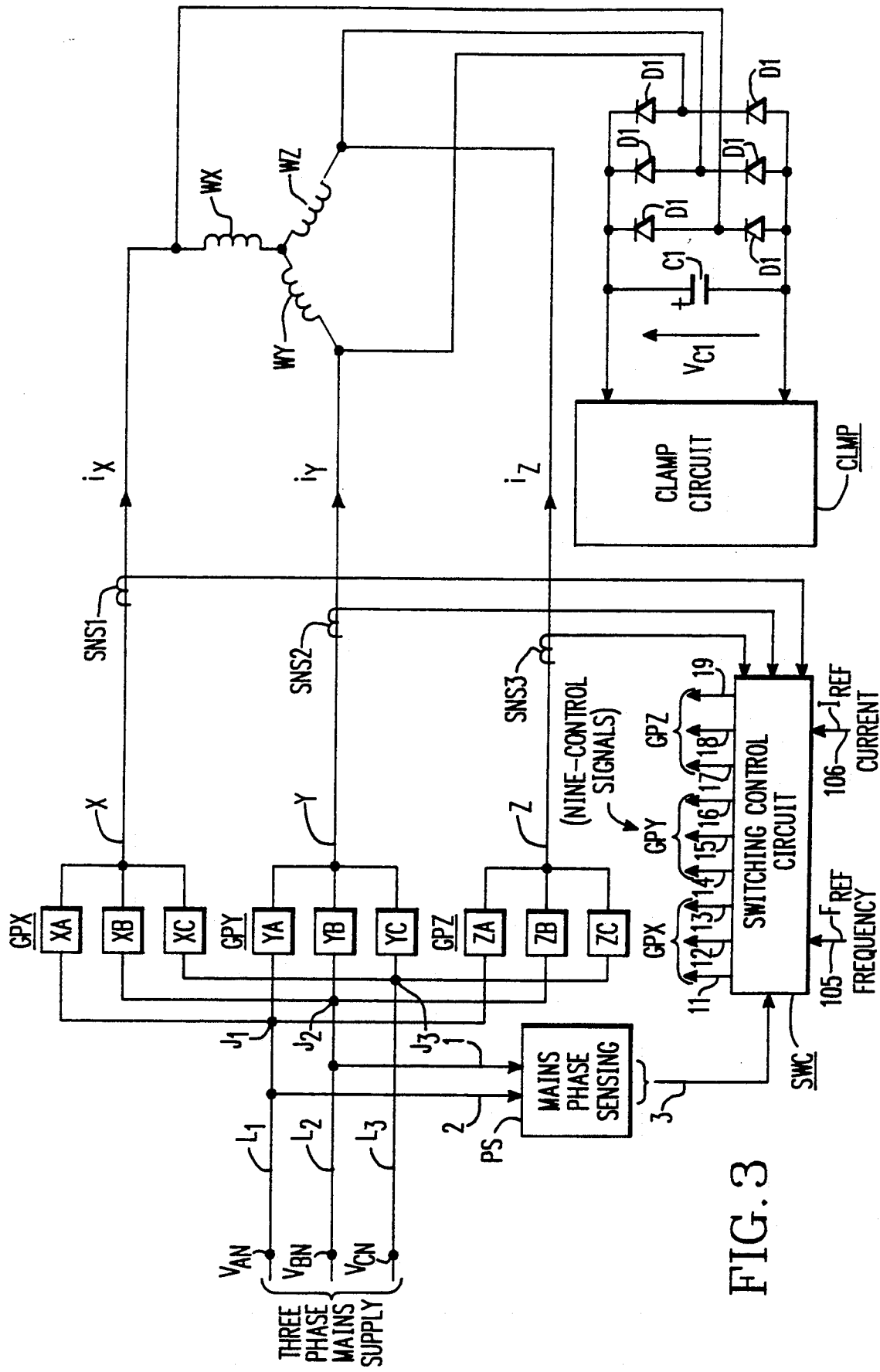
FIG. 3 illustrates the current-source type AC/AC converter according to the present invention, with its associated switching control circuit determining the polarity groups of bidirectional switches involved, and combined with clamping and energy dissipating circuits.
Figure 4:
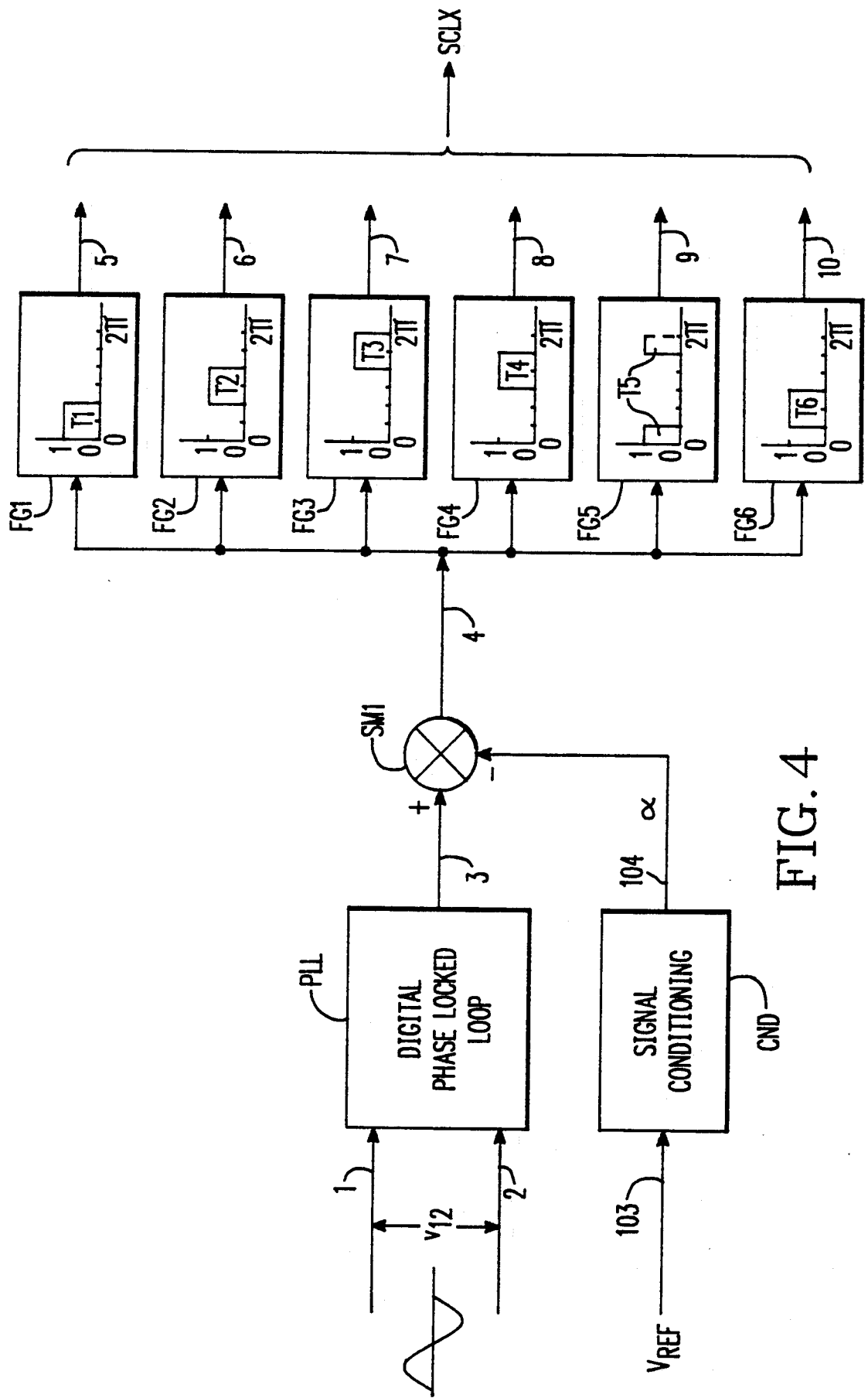
FIG. 4 is a schematic representation of a circuit used to generate existence functions for the switches within a particular selected group in the matrix of switches shown in FIG. 3.
Figure 5:
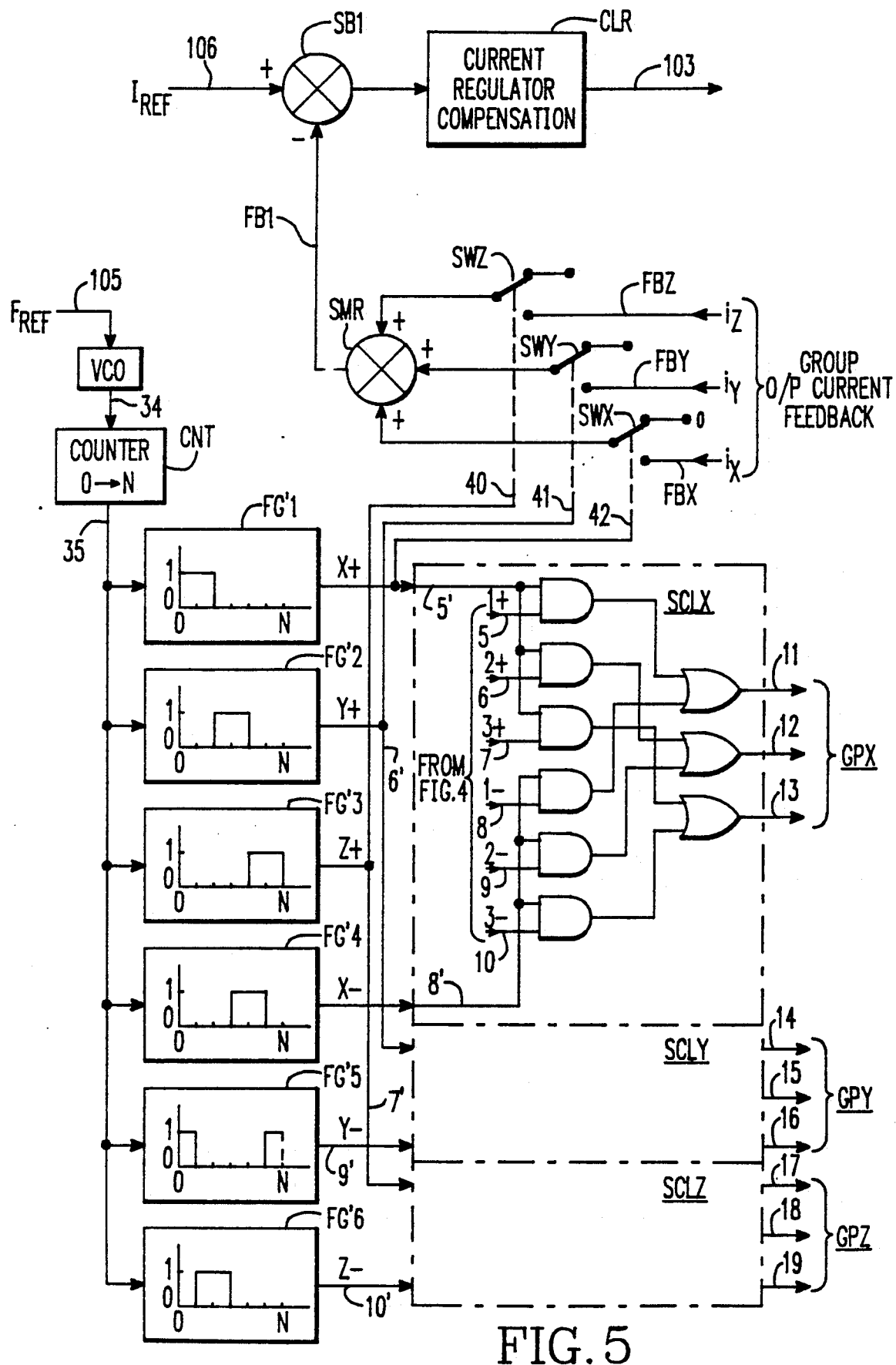
FIG. 5 shows in block diagram the switching control system of FIG. 3.

Referring to FIG. 3, the switching control circuit SWC of the AC/AC converter according to the invention (shown with more details in FIG. 5) is illustrated as applied to a matrix of nine bilateral switches like those of FIG. 2. When two switches belonging to two different groups, like XA in group GPX and ZC in group GPZ, are controlled for conduction, one is associated with the positive polarity (instantaneous current from the mains), for instance XA, the other is associated with the negative polarity, for instance ZC. As a result, current is flowing from one "terminal" to the other across the corresponding windings (WX for phase X and switch XA, WZ for phase Z and switch ZC, in this instance). While this occurs with groups GPX and GPZ, none of the switches of the third group (YA, YB, YC) is controlled. Accordingly, no current is flowing through the third winding (WY in this instance). This is achieved with the use of function generators (like at FG1' to FG6' in FIG. 5), establishing the existence and duration of a switch conduction in relation to one of the connected windings WX, WY or WZ, i.e. the output current existence. This duration is also determined by the assigned output frequency given by a frequency reference signal applied on line 105 (FIGS. 3 and 5). As shown in FIG. 5, a VCO circuit converts the applied analog signal of line 105 into a frequency signal which determines the recurrence and the rate of a counter CNT counting from pulse 1 to pulse N recurrently. Accordingly, function generators FG1' to FG6' of FIG. 5 are defining at such tempo the duration of conduction of a group of switches (FG1' by line 5' to logic selector circuit SCLX for group GPX, FG2' by line 6' to logic selector circuit SCLY for group GPY and FG3' by line 7' to logic selector circuit SCLZ for group GPZ, these being for one polarity; FG4' by line 8' to logic selector circuit SCLX for group GPX, FG5' by line 9' to logic selector SCLY for group GPY and FG6' by line 10' to logic selector SCLZ for group GPZ, these being for the other polarity). In relation to group GPX, for switch XA, the output line 11 of SCLX responds via an OR device either to an AND device joining lines 5 and 5' for the positive polarity, or to an AND device joining lines 8 and 8', for the negative polarity. Similarly, for the same group GPX but for switch XB, line 12 from SCLX responds through an OR device either to an AND device joining lines 6 and 5' for the positive polarity, or to an AND device joining lines 9 and 8'. Also for GPX, but for XC, line 13 responds through an OR device either to an AND device joining lines 7 and 5' for the positive polarity, or to an AND device joining lines 10 and 8', for the negative polarity. Similarly, for GPY and the respective switches YA, YB and YC are gated from SCLY by lines 14, 15, and 16, in accordance with corresponding pairs of lines (6',5); (6',6) and (6',7) for one polarity and the pairs of lines L (9',8); (9',9) and (9',10) for the other polarity. Finally, for GPZ, the relationship between lines 17, 18 and 19 in regard to ZA, ZB and ZC, respectively, as seen from SCLZ, involves the pairs of lines (7',5); (7',6) and (7',7) for one polarity and pairs of lines (10',8); (10',9) and (10',10) for the other polarity. Otherwise, the sequence of the conducting switches under the mains phase lines (A, B, C) is achieved, like for the operation of the matrix of FIG. 2, with the aid of a circuit, as shown in FIG. 4, including existence functions FG1 through FG6 which, for each switch, have a duration and a polarity related to the input phases A, B, C. These are establishing during 120 degrees an overlapping of 60 degrees (T5, T1, T6, T2, ...) from one switch to the next, or from the outgoing switch to the oncoming one, according to the following TABLE I:

TABLE I

| >0 | <0 |
|---|---|
| A+ | B− |
| A+ | C− |
| B+ | C− |
| B+ | A− |
| C+ | A− |
| C+ | B− |

Such electrical degrees of existence are in accordance with the phase-locked loop PLL of FIG. 4. The line-to-line voltage $v_{12}$ of phase lines 1 and 2 is converted by PLL into a digital signal (on line 3) representing the phase angle of the voltage from the input lines. If summer SM1 and line 104 are ignored for the moment, such signal of line 3 establishes the running electrical angle of the input voltage which (by line 4) controls the existence functions: FG1 for 60 degrees of phase A and FG4 for another 60 degrees of phase A, FG2 for 60 degrees of phase B, then function generator FG5 for another 60 degrees of phase B, and so on for phase C. The output lines 5 to 10 from FG1 to FG6 are applied to respective AND devices within each of the logic circuits SCLX, SCLY and SCLZ of FIG. 5, which AND devices also respond to the respective lines 5' to 10' from the respective function generators FG1' to FG6', as earlier stated.

In the case of FIGS. 3 and 5, the sequential conduction of the particular switch is commanded by gating pulses outputted on lines 11, 12, 13 for group GPX, on lines 14, 15, 16 for group GPY, and on lines 17, 18, 19 for group GPZ. The generation of a gating pulse will depend (because of the AND devices combining line 5' for the positive polarity and group GPX, with lines 5, 6, 7, or line 6' for the negative polarity and group GPX, with lines 8, 9, 10 upon the occurrence of an overriding logic ONE coming from FG1' for the positive polarity, or upon an overriding logic ONE coming from FG4' for the negative polarity). Accordingly, the state of the particular switch (XA, XB, XC) within the group (GPX, GPY, or GPZ) will be according to heretofore TABLE I. Thus, function generators FG1' to FG6' establish an overall time of conduction for the corresponding group and switch according to their existence functions, and this occurs for the output lines at the required motor frequency, established by a reference frequency signal $F_{REF}$ applied on line 105, after conversion by a VCO circuit, and by a count established by counter CNT translating the frequency into a command signal on one of the lines 35 to existence function generators FG1' to FG6'. The states of groups GPX to GPZ according to function generators FG1' to FG6' are summarized by TABLE II as follows:

TABLE II

| >0 | <0 | OFF |
|---|---|---|
| GPX | GPZ | GPY |
| GPY | GPZ | GPX |
| GPY | GPX | GPZ |
| GPZ | GPX | GPY |
| GPZ | GPY | GPX |
| GPX | GPY | GPZ |

When counter CNT has terminated its count, independently from the 60 degree recurrence on the input phases, a group commutation will occur illustrated by TABLE III as follows:

TABLE III

| GPX | GPY | GPZ | |
|---|---|---|---|
| A+ | B− | 0 | |
| A+ | C− | 0 | |
| B+ | C− | 0 | |
| etc. | | | |
| C+ | A− | 0 | |
| | | | (Group Commutation) |
| C+ | 0 | B− | |
| A+ | 0 | B− | |
| A+ | 0 | C− | |
| etc. | | | |
| C+ | 0 | B− | |
| | | | (Group Commutation) |
| 0 | A+ | B− | |
| 0 | A+ | C− | |
| etc. | | | |

On the other hand, the digital signal of line 5', ... or 10', when it is a ONE, will actuate a corresponding interrupter switch SWX, SWY or SWZ so as to pass the sensed current feedback signal, representing the corresponding motor current $i_X$, $i_Y$, or $i_Z$ flowing in the particular winding loop (of two operative windings for the motor) for a pair of switches and groups under conduction (the third group being inactive).

Figure 6A:
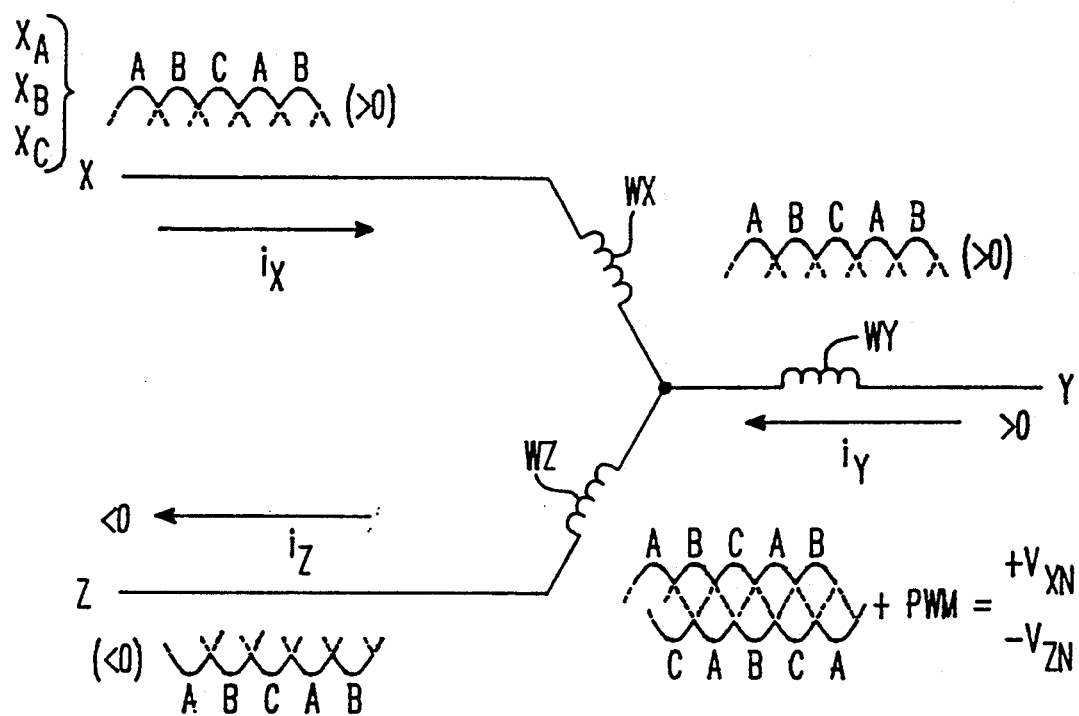
Figure 6B:
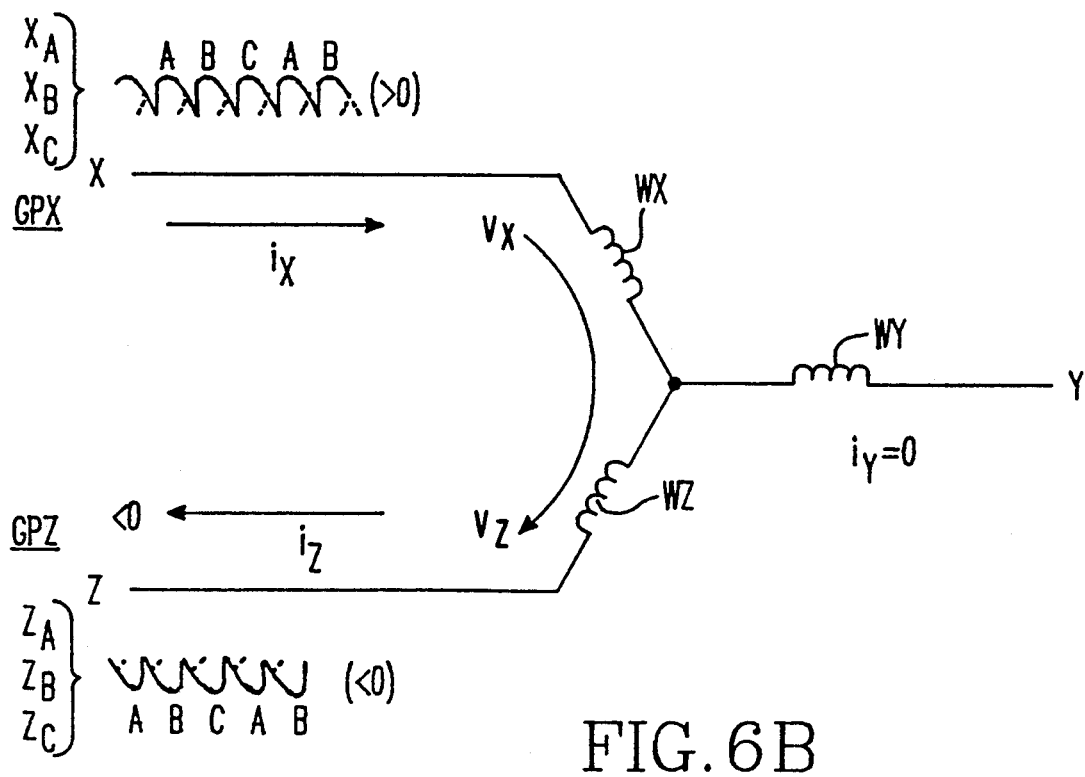
FIG. 6B shows the operation of the converter according to the present invention wherein two motor windings are involved at a time.

In order to distinguish further the operation of the system of FIG. 2 from the operation of the system of FIG. 3, reference should be had to FIGS. 6A and 6B. FIG. 6A shows, by reference to FIG. 2, that in each output phase X, Y, Z the group (GPX, GPY, GPZ) is controlled by selection of the particular switch (XA, XB, XC for group GPX) for the positive voltage polarity (>0 for phase X, >0 for phase Y at the instant chosen) or the negative voltage polarity (<0 for phase Z) according to the envelope of the voltage curves at the input (A, B, C). With such voltage (Vx, Vy, Vz) on the phase line (X, Y, Z) there is a current flowing in each of the three windings. This current is determined by the voltage magnitude and polarity which is a square wave built with the envelope of the A, B, C waves from the mains by controlling the duration and alternance thereof. Similarly, the output voltage can be formed by pulse-width-modulation. The magnitude of the output voltage can be modified by altering the firing angle $\alpha$, but this is not done continually as part of the control. In the example shown by FIG. 6A such, modulation leads to voltage-to-neutral voltages +VxN for phase X, +VyN for phase Y and VzN for phase Z. As shown in U.S. Pat. No. 4,642,751, these voltages are square waves of 180 degrees alternance. The system operates as a voltage-source.

Referring to FIG. 6B and to FIG. 5, according to the present invention, the existence functions of generators FG1' to FG6' of FIG. 5 determine only two groups operating at a time, GPX and GPZ in the example. Each group is operative during 120 degrees (of the output voltage and current) with an overlap of 60 degrees from one paired switch to the other (X+ with Y-followed by X+ with Z—; then Y+ with Z- followed by Y+ with X-; and so on). It is seen that the third phase line is controlled by a signal of logic zero established during 60 degrees for one phase line (X, Y or Z), each motor phase being inactive in this way for a total of 120 degrees in one cycle of the output. The system is now operating much like a current source under the applied and controlled voltage, and there is a single current at a time, passing between the two associated winding ($i_x = i_z$; ...).

Figure 7:
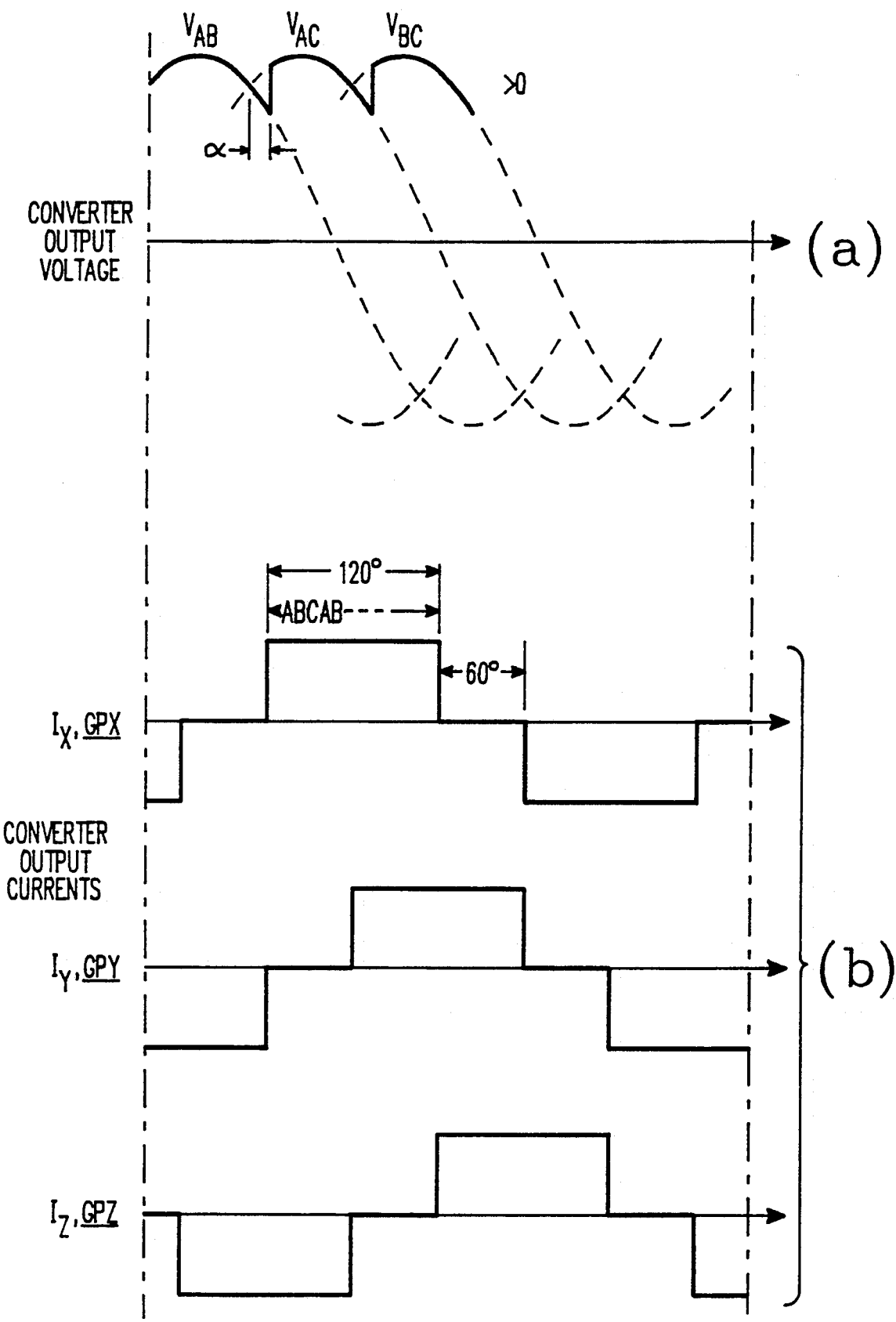
FIG. 7 illustrates with curves the line-to-line voltage and phase-line currents at the output with the circuit of FIGS. 3 and 4.

Referring to FIG. 7 and curve (a), the output voltage driving the quasi-DC controlled current is shown for a given firing angle. The firing angle determines the magnitude of the voltage existing between the two active groups which establish the flow of current through the associated windings of the motor. Curves (b) show for the three phases X, Y, Z of the motor the idealized currents flowing therethrough.

Curves (b) of FIG. 7 show the resulting quasisquare shaped currents. Each output phase has a constant current during 120 degrees for one polarity inbetween two periods of 60 degrees with zero current. There is a current ripple (not shown) due to the effect of the mains line voltages A, B, C. Each current has a 120 degrees period of flow, in one direction or the other, and a preceding as well as a following period of 60 degrees when no current is flowing. Heretofore TABLE I shows the switches of one group sequentially gated for conduction as either a positive or a negative current source from the AC input lines. The succession exemplified by TABLE I may repeat itself depending upon the required 120 degree duration for the assigned motor current. This succession is illustrated upon curves (b). TABLE II shows the state of the groups GPX, GPY and GPX under operation according to TABLE I, whereas TABLE III combines TABLE I and TABLE II in order to show successive 60 degree periods of the output with intervening group commutation occurrences. It is observed that although the group commutation has been shown in TABLE III as occurring at the end of a switch conduction state or of a non-conduction state, the switches being capable of being triggered at any time, such instant of group commutation could be called for at, any time in the middle of such switch state. It is observed that here the selected polarity for a particular active switch group refers to the polarity of the current output from that group, but not to the voltage as in the prior art. Therefore, it is quite possible for a selected positive group to be generating a negative output voltage matching the back end of the motor, for example.

FIG. 5 shows the digital function generators FG1'-FG6' with their 60 degrees ON states, generating on lines 36, 37 and 38 (for X+, Y+and Z+, respectively) and on lines 36', 37' and 38' (for X—, Y— and Z—, respectively) the positive and negative polarities assigned to the switch of a group (as selected by lines 5 to 1 of FIG. 4) so as to generate for each switch a gating pulse on one of lines 11, 12, 13 for group GPX, on one of lines 14, 15, 16 for group GPY, or one of lines 17, 18, 19 for group GPZ.

Control of the current is effected by reference to a current feedback signal derived from the output lines (at SNS1, SNS2 and SNS3 in FIG. 3) on lines FBX, FBY and FBZ. As shown in FIG. 5, interrupter switches (SWX, SWY, SWZ) are provided, each applying when closed a current feedback signal ($i_X$, $i_Y$, or $i_Z$ derived on feedback lines FBX, FBY and FBZ, respectively) for a 120 degrees duration. Those lines FBX, FBY and FBZ, beyond their switch, are connected to a common summer SMR passing the current, via line FB1, to a subtractor SBI where such feedback current is being compared to a current reference signal received on line 106. In fact, the signal of line FB1 is the value of the instantaneous output current of whichever group is selected for positive polarity. The error is passed through a current regulator compensation circuit CLR to generate on line 103 a voltage demand signal for controlling the voltage accordingly. Control of the voltage is as shown by curve (a) of FIG. 7 depending upon the firing angle. The current being generated in the winding loop ($i_X$, $i_Y$ or $i_Z$) is controlled by adjusting the voltage, by line 103 of FIGS. 4 and 5. A reference voltage is applied to circuit CND (FIG. 4) for generating a signal on line 104 representing the compensating firing angle, which on line 4 tells by how much from the zero firing angle condition the existence functions of FG1, ... FG6 should be shifted. As generally known, such shifting of the firing angle will cause the voltage (illustrated by curve (a) in FIG. 6) to increase or decrease, accordingly. FIG. 4 shows how the voltage command signal of line 103 after conditioning by circuit CND (as generally known) becomes on line 104 a signal representative of the firing angle $\alpha$, which compensates for the zero firing angle condition of line 3 (summer SMI combines lines 3 and lines 104 to establish by line 4 the proper phase shift for the function generators FG1 to FG6).

It is observed that when current disappears in one positite group (for instance X) and reappears with the same polarity (then, under Y) in another group, a continuous representation of the positive current can be obtained by selecting first $I_X$ as the instant feedback, then, changing to $I_y$ at the instant of transition. Therefore, interrupter switches SWX, SWY and SWX of FIG. 5, as they are shown, are controlled by the positive polarity existence functions, namely from FG1', FG2' and FG3', respectively.

Figure 8:
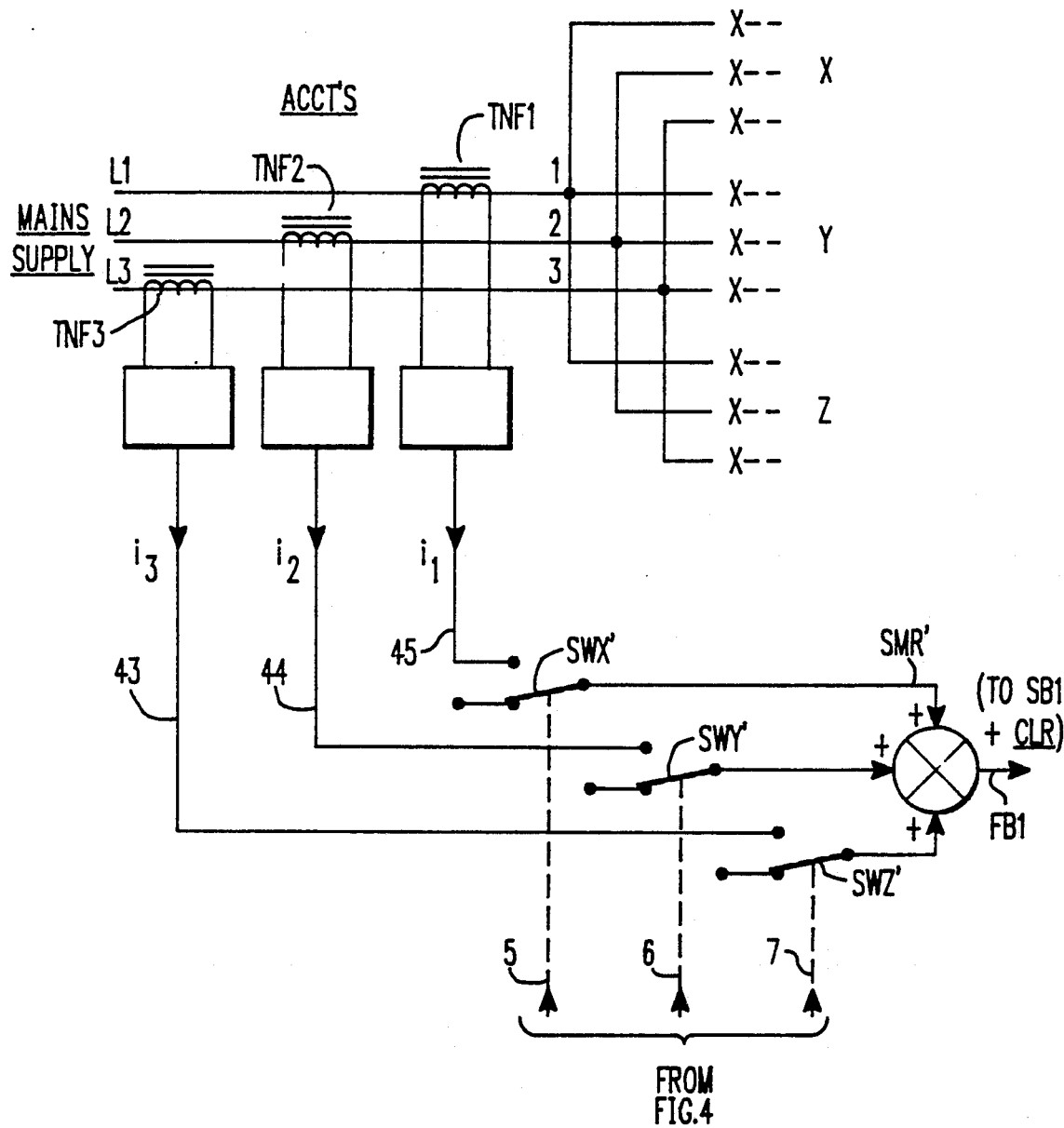
FIG. 8 illustrating as opposed to FIG. 5, an alternative mode of deriving current feedback signals using AC current transformers coupled at the input of the converter.

As shown by FIG. 8, current sensing may be also implemented on the input side of the converter, i.e. on the mains lines A, B, C, since the current which is drawn in a winding loop comes from, and also returns, to the mains L1, L2, L3. Instead of sensors SNS1, SNS2, SNS3 on the output side (FIG. 3), AC current transformers TNF1, TNF2 and TNF3, are now coupled to the input phases (mains L1, L2, L3), respectively, to derive signals ($i_1$, $i_2$, $i_3$) representative of the current existing predominantly in the mains input phases. In order to assemble the quasi-DC feedback current signal (FB1), interrupter switches SWX', SWY' and SWZ', are provided which are controlled by lines 5, 6, 7 from the function generators FG1, FG2 and FG3 relative to one polarity (the positive one). The feedback currents derived from the transformers (lines 43, 44 and 45, respectively) are passed through a corresponding one of the interrupter switches (SWX', SWY', SWZ') and a summer SMR' brings the output from any of the switches to line FBI going, like in FIG. 5, to the current regulator CLR providing the voltage command signal of line 103. Voltage control to establish an assigned current magnitude for the AC motor is, thus, like in FIG. 5. Also, the frequency demand for the output current of the motor is translated digitally by function generators FG1' to FG6' into group polarity selections at the rate required. The outputted quasi-square wave of FIG. 6 will have the same 120 degree levels, but of controlled length, in accordance with the assigned number of switch states between group commutation occurrences (TABLE III).

Considering now the operation of the converter system according to the present invention, it is observed that, like with an ASC-CSI system, only two phases of the motor conduct, except during group-to-group commutations of the load current. The current is controlled to a reference value (line 103 of FIG. 4 and FIG. 5) by the action of the closed-loop regulator (CLR of FIG. 5). It is, however, necessary to consider that while one of the three windings is interrupted at one time and becomes energized at another time, commutation from one winding loop to another is important. When a commutation between groups begins, the switches in the outgoing group are turned OFF, and the switches in the incoming group begin to conduct with the switching pattern which is appropriate to the group polarity. In order to facilitate the commutation, a clamping circuit CLMP is provided comprising, as shown in FIG. 3, a capacitor C1 mounted across a diode bridge (diodes D1) itself across the three output lines to the motor. The capacitor is maintained charged to a voltage $V_{c1}$, which appears in the commutation loop and will assist in decreasing the current in the outgoing winding to zero and in increasing the current in the incoming group. In the outgoing group, the current is reduced to zero very rapidly, while the voltage between the associated motor line and the other two lines also increases rapidly (positively, or negatively). When these voltages reach the level $V_{c1}$, the clamping circuit diode bridge is forward biassed and, as the group current continues to fall, the outgoing motor line current is transferred to the clamping capacitor. The clamp voltage $V_{c1}$ now appears between the outgoing and the incoming motor lines with the right polarity to support the commutation. The rate of rise of the commutating current is, then more or less constant, being it determined by $V_{c1}$ and the line-to-line stator leakage inductance of the machine.

Figure 9:
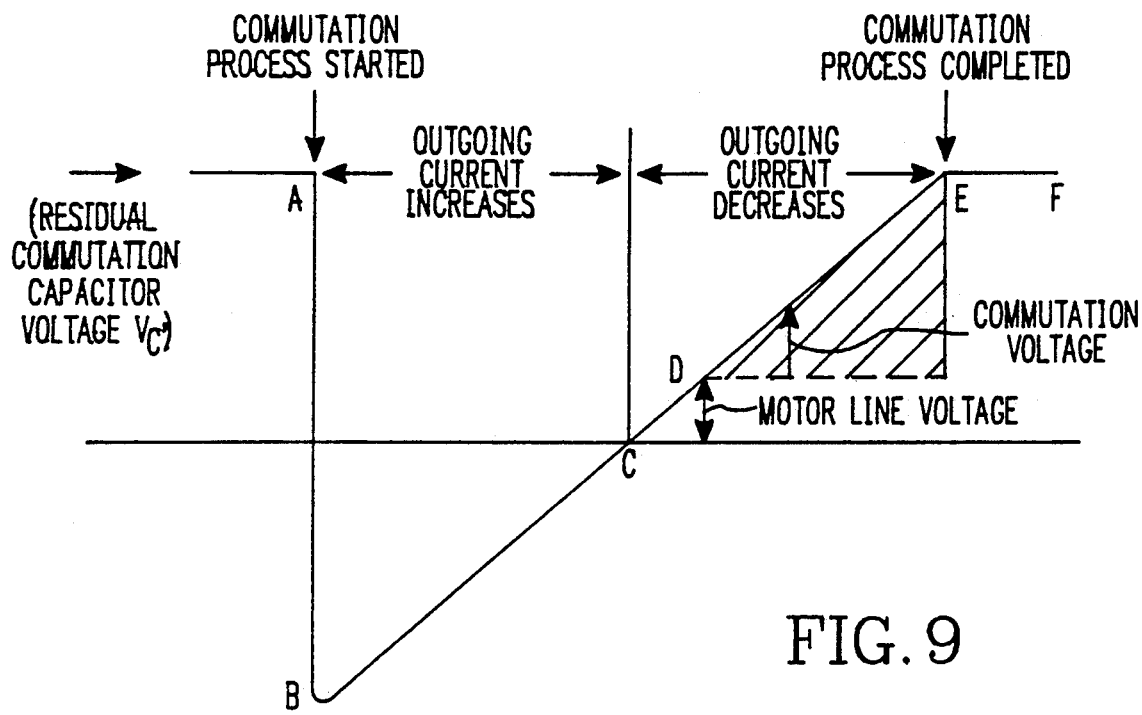
FIG. 9 a curve illustrating the commutation process between groups of switches in a conventional ASC-CSI system.
Figure 10:
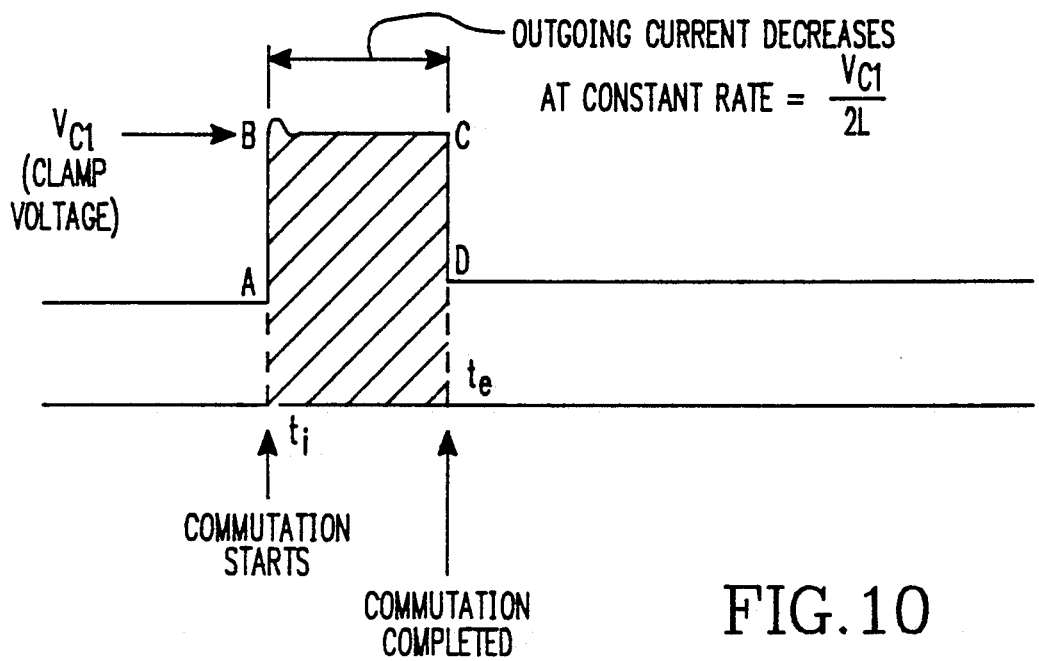
FIG. 10 shows the line-to-line motor voltage during a commutation effected according to the present invention.

FIG. 1 shows for an ASC-CSI system, the forced-commutation circuit of the inverter thyristors comprising capacitors C and diodes D. FIG. 1 also shows a voltage clamp comprising a capacitor C' charged to a fixed clamping voltage and a rectifier (RCT') which, in a conventional ASC-CSI, are limiting the line-to-line voltages during commutations of the load current, as generally known. An energy sink is provided for clamping the capacitor to a value $v_{c1}$, either by dissipating the excess of energy or to returning it to the supply. FIG. 3 shows in the context of the present invention the same circuitry identified by a capacitor C1 and diodes D1 to D6 in a rectifier bridge, together with a clamping unit CLMP. It is observed that the commutating voltage $V_{c1}$ appears almost instantaneously in the commutation loop when a group-to-group commutation is initiated, whereas in the ASC-CSI of FIG. 1 there is a substantial delay taking place while the commutation capacitors discharge and recharge to the motor line voltage before any commutating voltage appears. This is illustrated by FIG. 9 relative to Fi by FIG. 10 relative to FIG. 3. In the ASC-CSI situation (FIG. 9), the commutation process starts along line AB when the commutation capacitor voltage initially appears in the commutation loop with the wrong polarity. The outgoing current, thus, increases initially during the period extending from B to C, while reducing the charge of the capacitor to zero. From D the outgoing current decreases after the capacitor voltage reaches the motor line voltage at D. From D to E the commutation capacitor voltage rises in the commutation until completion at the level EF. In contrast, with FIG. 10 according to the present invention, the commutation starts at instant $t_i$, when the commutating voltage (equal to the clamp voltage $V_{c1}$) appears in the commutation loop, is and if completed as early as instant te (from B to C) the outgoing current having decreased at a constant rate $V_{c1}/2L$ (where L is the inductance of one motor winding, and there are here two windings involved). When the commutation begins, the switches in the outgoing group are turned OFF and the switches in the oncoming group begin to conduct with the switching pattern appropriate to the group's polarity. As the current in the outgoing group is reduced to zero very rapidly, the voltage between the associated motor line and the other two lines also increases rapidly (positively, or negatively) as shown by AB on FIG. 10. When these voltages reach the level $V_{c1}$, the clamping circuit diode bridge is forward biassed and, as the group current continues to fall, the outgoing motor line current is transferred to the clamping capacitor C1. The clamp voltage $V_{c1}$ (from B to C) appears between the outgoing and oncoming motor lines with the right polarity to support the commutation. The rate of rise of current in the oncoming motor line is then more or less constant, being determined by Vc and the line-to-line stator leakage inductance L of the machine (21 for the two windings). The rate at which energy is delivered to the clamping capacitor depends upon the load current, the motor leakage inductance and the frequency of commutation.

The circuit of FIG. 3 still offers more advantages. It eliminates the current spikes which occur in the ASC-CSI owing to the discharge of the commutation capacitor in series with the supply voltage. Also, since the commutation time is short the circuit can operate at much higher frequency than with the ASC-CSI circuit. It is possible, though, to set the clamping voltage lower so as to produce somewhat longer commutations but with lower peak voltages appearing line to line. Bulky commutation capacitors are eliminated, and there is no DC-link choke. Commutation failures when the supply voltage dips during regeneration (as encountered in an ASC-CSI supply converter) are not occurring here. By controlling the phase control angle so as to produce phase advance instead of delay, the input displacement factor may be made leading. Finally, startup problems which require to precharge commutation capacitors do not exist.

Figure 11:
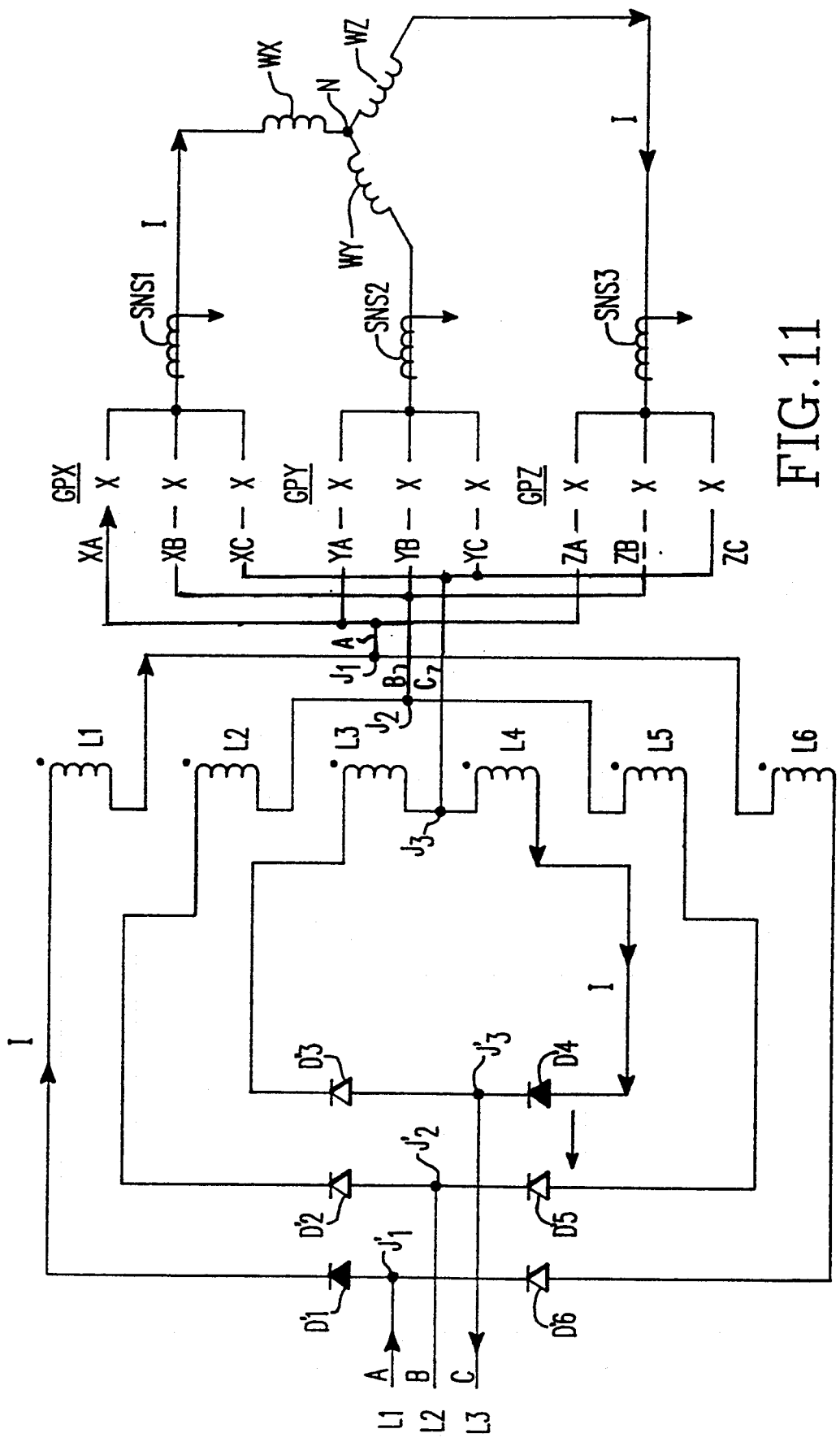
FIG. 11 shows the use of an input line reactor in conjunction with a diode bridge in order to smooth the overall quasi-DC current generated according to the present invention, all such line reactors being mutually coupled so as not to appear in the commutation loop.

FIG. 3 includes circuitry to assist in the commutation between group GPX, GPY, and GPZ. Referring to FIG. 11, such a circuitry is shown to assist in the commutation between phase switches XA, XB, XC in group GPX, YA, YB, YC in group Y and ZA, ZB and ZC in group GPZ. If J1, J2 and J3 are the nodal point between a phase line (A, B, C, respectively) and the associated switches in each group, two parallel branches have been added on each phase line: from phase A and junction J1' to junction J1, for one direction of current flow there is a diode D1' and an inductor L1, for the other direction there is another diode D6' and another inductor L6. Similarly, for junction J2' of phase B there is a diode D2' with an inductor L2 and another diode D5' with an inductor L5 going separately to junction J2. Also, for junction J3' of phase line C, the added circuits are diode D3' with inductor L3 and diode D4' and inductor L4, going to junction J3. The inductors are (1) all the same in ampereturns and direction of winding and (2) all magnetically coupled. With this system, when current is flowing through the motor windings (WX and WZ as shown, With diodes D1' and D4' conducting) the inductances (L1 and L4) double their effects by pairs, thereby eliminating undesirable harmonics at the input and output of the converter. However, should a commutation be started (between ZC of group GPZ and ZB of the same group), the commutation loop current flows in opposite directions in L4 and L5 with no resulting inductance being present because the two inductors (L4 and L5) are opposing their effects. In other words, the circuit of FIG. 11 permits a high quality of the input phase line voltages without impeding commutation between power switches of a group.

A current-source matrix converter has been disclosed hereabove which offers the advantages of an ASC-CSY system without the attending defects. Thus, high bandwidth torque control of AC motor drives is available because of the inherent MMF vector control capability, with an approach which eliminates the possibility of failure when load impact occurs, as with the ASC-CSI system of the prior art.

I claim:

1. An AC/AC converter, connected between AC input lines and AC output lines, said input lines being connected to a power supply and said output lines being connected to a load, and including a plurality of bilateral switches connected in groups, each group being associated in common with one of the respective AC output lines and the bilateral switches in each group being associated with the AC input lines, respectively, each bilateral switch when turned ON connecting one AC line associated therewith to one AC output line common with the group, comprising:

first means for successively selecting in sequence said groups by pairs, each pair of group for a predetermined duration to establish a single current path through the load, said current being for said duration in one direction through one selected group of said pair and in the opposite direction through the other selected group of said pair, said sequence and duration determining the frequency of alternation of said current in the load;

second means for successively gating for conduction in relation to the AC input line voltages said bilateral switches of a selected pair of groups for establishing a voltage between the output lines of said selected pair of groups;

means being associated with said gating means for adjusting the phase of gating relative to the voltage of said input lines for controlling said establishing voltage and for establishing therewith a desired magnitude of current on said output lines;

whereby a current source of controlled magnitude and frequency is applied to said output AC load lines.

2. The converter of claim 1 including sensing means for measuring the magnitude of said outputted AC current, comparator means responsive to a current magnitude reference signal and to said sensing means for outputting an error signal relative to said current magnitude reference signal; and means for generating a voltage demand signal in relation to said error signal; with said second means being responsive to said voltage demand signal for establishing a voltage in relation thereto.

3. The converter of claim 2 with said first means including first function generator means for controlling said sequence of paired groups by establishing a predetermined duration for each pair of groups.

4. The converter of claim 3 with said second means including second function generator means for controlling said bilateral switches of a group during successive elementary time intervals each initiated by reference to said input line voltage.

5. The converter of claim 4 with said second means operating upon said bilateral switches by adjusting the firing angle thereof in response to said error signal for correlatively changing said established voltage, thereby to establish a desired current magnitude.

6. The converter of claim 5 with said first means including means responsive to a frequency reference signal for establishing said predetermined duration of each pair of groups.

7. The converter of claim 6 with said sensing means being coupled with said output lines, said sensed signals being derived in response to the operation of said first function generator means.

8. The converter of claim 6, with said sensing means being coupled to said input lines, said sensed signals being derived in response to said second function generator means.

9. The converter of claim 6 with voltage clamping means being provided and connected to said AC output lines for assisting commutation between successive pairs of groups under said first function generator means.

10. The converter of claim 9 with a series-network comprising a diode and an inductor being inserted between each bilateral switch and the associated input line for eliminating current harmonics, said inductors being mutually coupled for easy commutation therebetween.

11. The converter of claim 1 with said load being an AC motor, and the AC/AC converter operating as a motor drive.

* * * * *